Dec. 19, 1961   H. J. JONES   3,013,860
MANUFACTURE OF AMMONIUM SULFATE
FROM SULFURIC ACID SLUDGE
Filed Sept. 22, 1958
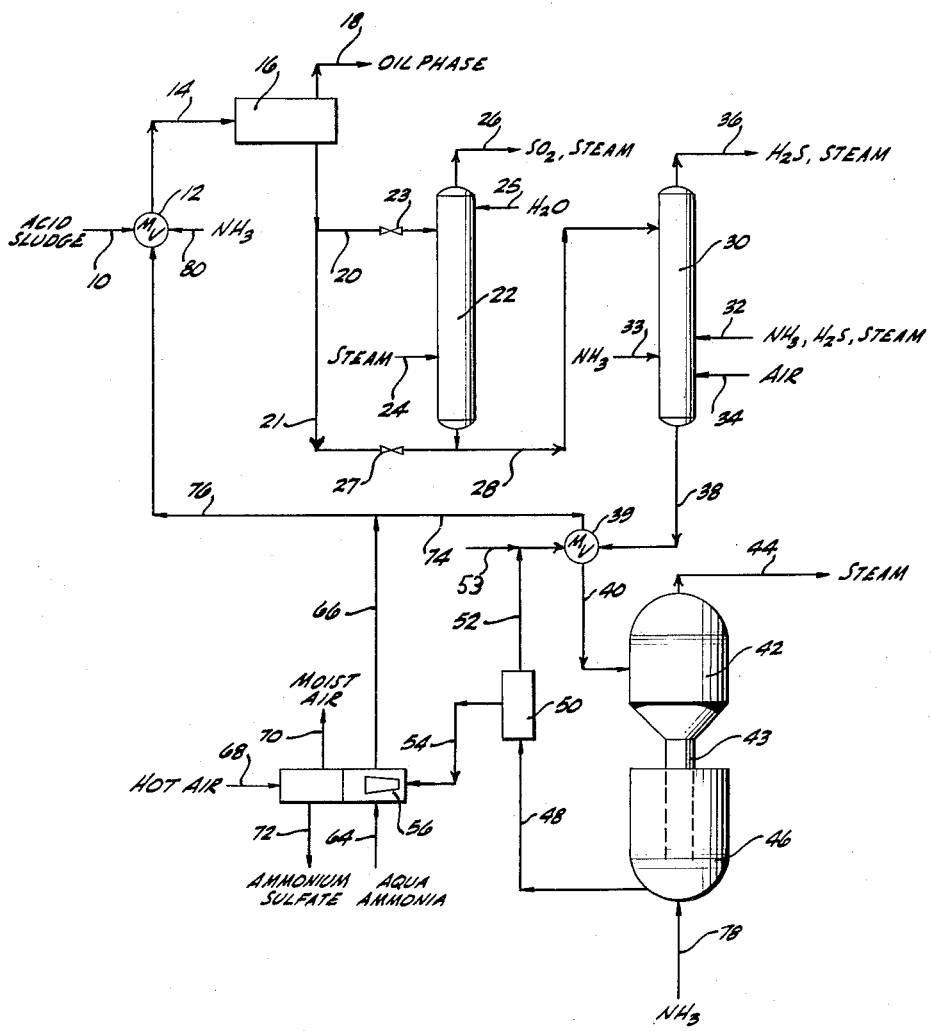
INVENTOR
HERBERT J. JONES,
BY
Richard C. Nachman
ATTORNEY.

United States Patent Office 3,013,860
Patented Dec. 19, 1961

3,013,860
MANUFACTURE OF AMMONIUM SULFATE FROM SULFURIC ACID SLUDGE
Herbert J. Jones, Rolling Hills, Calif., assignor to Union Oil Company of California, Los Angeles, Calif., a corporation of California
Filed Sept. 22, 1958, Ser. No. 762,586
11 Claims. (Cl. 23—119)

This invention relates to the manufacture of ammonium sulfate, and in particular concerns an improved process for manufacturing ammonium sulfate of uniform crystal size and light color from spent sulfuric acid sludges which are produced as by-products in the refining of petroleum and similar hydrocarbons.

It is well known to produce ammonium sulfate by reacting ammonia with the spent acid sludge obtained in the treatment of various petroleum fractions with sulfuric acid. Such sludge is a complex material comprising free sulfuric acid, sulfuric esters, sulfates of nitrogen bases, water, and entrained oil as major components. The reaction of anhydrous or aqueous ammonia with such sludge, or with an aqueous acid solution obtained by hydrolysis of the sludge, produces an ammonium sulfate solution which is then dewatered to form ammonium sulfate crystals. The size, form and color of the crystals are to some extent affected by the process variables, particularly the concentration of free acid in the reaction product and the period of time over which the dewatering operation is carried out. However, the formation of off-color products of non-uniform crystal size has been found to be due primarily to the presence of certain impurities, e.g., iron, aluminum, chromium and the like in the sludge. The amount of organic compounds in the sludge also contributes to the formation of dark-colored products. From a standpoint of appearance it is of course desirable to produce light-colored products of large and uniform crystal size. Uniformity of crystal size is further desirable when the product is to be used as a fertilizer since uniformity permits even distribution over the soil.

It is accordingly an object of this invention to provide an improved process for producing crystalline ammonium sulfate.

A further object is to provide a process for manufacturing ammonium sulfate in the form of large, light-colored uniformly-sized crystals which are free-flowing and are non-caking.

Another object is to provide an improved process for preparing ammonium sulfate from spent acid sludges.

Other and related objects will be apparent from the following detailed description of the invention, and various advantages not specifically referred to herein will be apparent to those skilled in the art upon employment of the invention in practice.

I have now found that the foregoing objects and their attendant advantages can be realized in a process in which the acid sludge is initially treated to remove part of the organic components thereof, and is thereafter reacted with ammonia in the presence of air or other oxygen-containing gas. More particularly, I have found that large light-colored uniformly-sized crystals of ammonium sulfate can be produced by a process which comprises: (1) treating the spent acid sludge with a relatively small amount of ammonia and/or a recycle stream of mother liquor from the subsequent ammonium sulfate crystallizing step, whereby there is produced an aqueous acid phase and an oil phase comprising the majority of the organic compounds originally present in the sludge; (2) separating the aqueous acid phase from the oil phase; (3) contacting the aqueous acid phase with ammonia in the presence of an oxygen-containing gas to obtain a slightly acidic ammonium sulfate solution; (4) dewatering said ammonium sulfate solution to obtain crystalline ammonium sulfate; (5) separating the ammonium sulfate crystals from the mother liquor; (6) recycling a part of the mother liquor to the initial step (1); and (7) returning the remainder of the mother liquor to the dewatering operation. Such sequence of operation has been found consistently to yield an ammonium sulfate product of exceptionally large and uniform crystal size and of a uniform light tan coloration. Operations identical to the above, but without the use of oxygen in step (3), yield a non-uniform crystalline product with a large amount of fines (crystals below 60-mesh) and are further characterized by frequent sporadic occurrences of a dark-colored product.

The spent acid sludges which may be employed in the process of the invention are those obtained from the processing of various hydrocarbon fractions with sulfuric acid. The exact nature of the sludge depends upon the type of hydrocarbon feed which has been treated, upon the initial strength of the sulfuric acid, and upon the temperature of the treatment. For the most part, such sludges are obtained by treating petroleum distillates with sulfuric acid of 80–100 percent concentration. For example, kerosene and solvent fractions are commonly treated with sulfuric acid of such concentration to improve color and remove gum-forming constituents. The spent acid sludges from such kerosene or solvent treatments typically contain from about 40 percent to about 80 percent by weight of sulfuric acid, with the remainder comprising water and such organic materials as acid sulfates, sulfonic acids, sulfuric esters and entrained hydrocarbons. In the acid treatment of heavier stocks, e.g., pressure distillate naphthas, the resulting sludges usually contain less sulfuric acid, e.g., from about 25 percent to about 65 percent by weight and a higher proportion of organic compounds, including sulfates of nitrogen bases. Another type of sludge consists of the spent alkylation acid which has been employed as a catalyst for the alkylation of iso-paraffins with olefins. Spent alkylation acid normally contains about 80 percent to about 95 percent sulfuric acid, the remainder being organic constituents and water. These spent acid sludges may be treated individually or combined with each other as the demands of the refining operation dictate. Other waste acid streams obtained from the treating of hydrocarbon fractions derived from coal, oil-shale, tar sands, and the like may also be used.

The ammonia reactant may be essentially pure anhydrous or aqueous ammonia or, more preferably, it may be an aqueous ammonia stream produced in the thermal or catalytic cracking of nitrogenous hydrocarbon stocks. The product stream from such cracking operation usually comprises a considerable quantity of water which is condensed and separated from the cracked hydrocarbons. Such waste water streams contain dissolved ammonia, usually in the form of the hydrosulfide, sulfide and carbonate. When these waste waters are stripped with steam the effluent comprises steam, ammonia, hydrogen sulfide, and minor portions of carbon dioxide and hydrogen cyanide. Such waste water stripper effluent is a convenient source of ammonia for the present process. In most refineries, however, the amount of ammonia produced in waste water stripper effluents is insufficient to neutralize all of the acid sludge produced; accordingly, it is usually necessary to employ additional ammonia, e.g., to supplement the refinery production of waste ammonia.

The various steps which comprise the process of the invention and the conditions under which they are carried out will be more readily understood by reference to the accompanying drawing which is a flow sheet illustrating one particular embodiment of the process. The spent acid sludge is brought into mixing valve 12 through line 10 and is therein blended with recycled hot ammonium sulfate mother liquor which is supplied via line 76 from the crystal separation step. Such recycling utilizes the heat content of the mother liquor to raise the temperature of the acid sludge to about 175°–250° F., at which temperature a large proportion of the organic constituents of the sludge separates from the sulfuric acid and water. Usually the amount of mother liquor which is recycled to mixing valve 12 will be that equivalent to between about 2 and about 20 volumes per volume of acid sludge. If desired, part of the heat required to raise the sludge to the stated temperature may be the heat generated by reacting a small part of the sludge with a small amount of ammonia introduced into mixing valve 12 via line 80. The mixture of acid sludge and mother liquor flows via line 14 to acid separator 16 where the oil phase is allowed to rise and is withdrawn via line 18 and sent to recovered oil storage. The subnatant aqueous phase, which usually contains between about 2 and about 20 percent, preferably between about 4 percent and about 12 percent, by weight of free sulfuric acid, is withdrawn from separator 16 via line 20 and is introduced into vacuum stripping column 22 for removal of dissolved sulfur dioxide.

Steam, at a temperature between about 250° F. and about 350° F., is admitted to stripping column 22 from line 24, and passes upwardly therein countercurrent to the descending stream of aqueous acid. The vapors of sulfur dioxide and steam are removed from the top of the column via line 26. An auxiliary stream of water is usually introduced to the top of column 22 from line 25 to prevent crystal formation within the column. The sulfur dioxide stripping operation is carried out for the purpose of avoiding the formation of free sulfur in the reaction zone when the acid sludge contains sulfur dioxide and the ammonia stream contains hydrogen sulfide. Accordingly, if the acid is free of sulfur dioxide and/or the ammonia is free of hydrogen sulfide, the stripping operation may be dispensed with by closing valve 23 in line 20 and opening valve 27 in by-pass line 21.

The stripped aqueous acid removed from column 22, or the aqueous acid in by-pass line 21, is passed via line 28 to absorber 30 in which the bulk of the acid is neutralized with ammonia introduced from line 32. As previously stated, the ammonia reactant is preferably an impure product obtained by stripping the waste water from thermal or catalytic cracking units. When such an impure ammonia product is employed it is preferred to operate absorber 30 at a temperature in excess of about 200° F., preferably from about 230° F. to about 250° F., and at sufficient pressure to prevent the absorption of hydrogen sulfide into the aqueous reaction mixture. When the ammonia reactant is substantially pure ammonia, absorber 30 is preferably operated at a temperature between about 150° F. and about 250° F. and at atmospheric pressure. When substantially pure ammonia is employed in place of or to supplement the impure ammonia reactant, it is introduced into absorber 30 from line 33. As previously stated, only the bulk of the acid reactant is neutralized in absorber 30. It has been found that improved results are obtained when the initial part of the subsequent dewatering operation is carried out under slightly acid conditions. Accordingly, the amount of ammonia which is introduced in absorber 30 will be slightly less than that required for complete neutralization. Preferably, the amount of ammonia employed is such that the ammonium sulfate solution which is withdrawn from absorber 30 has a pH value below about 5 and contains about 4–8 percent of free sulfuric acid.

In addition to the acid and ammonia reactants, absorber 30 is supplied with a stream of air from line 34. Preferably between about 100 to about 200 s.c.f. of air are introduced into the absorber per ton of dry crystalline ammonium sulfate produced in the process. However, the presence of even small quantities of air in absorber 30 will give a marked improvement in color and crystal size of the ammonium sulfate product, and the use of a large excess of air presents no particular disadvantage. Air is preferably introduced into absorber 30 through a sparger or similar device located in the lower part of the absorber so as to obtain intimate contact between the air and the reaction mixture. If desired, the stream of air may be replaced with an equivalent amount of oxygen, either pure or in admixture with inert gases.

The overhead from absorber 30, consisting essentially of steam, hydrogen sulfide and excess air, is removed via line 36. The aqueous reaction product formed in absorber 30 is withdrawn therefrom and passed to mixing valve 39 via line 38. Within mixing valve 39, the reaction product is admixed with hot recycled mother liquor supplied via line 52 from slurry concentrator 50 and via line 74 from the crystal separation step. Makeup water to the process, if required, is introduced into line 52 via line 53. The amount of recycled mother liquor supplied to mixing valve 39 is such that the mixture which is withdrawn therefrom and passed via line 40 to vacuum crystallizer 42 contains between about 1 percent and about 3 percent by weight of free sulfuric acid and is at a temperature between about 140° F. to about 200° F. Crystallizer 42 is operated at a reduced pressure, e.g., at 1–6 p.s.i.a., so that a considerable portion of the water contained in the feed liquor is flashed off to form a crystal slurry. The latter flows from crystallizer 42 through barometric downpipe 43 into crystal classifier 46. Within the latter, crystal growth occurs resulting in the settling of large crystals of ammonium sulfate. Ammonia is injected continuously or intermittently into the bottom of classifier 46 through line 78 in such an amount that the concentrated slurry of large ammonium sulfate crystals removed from the bottom of the crystallizer contains a small amount of free acid and has a pH value between about 4.0 and about 5.0. From classifier 46 the crystal slurry is passed via line 48 to slurry concentrator 50 where further settling and size separation takes place. The concentrated slurry from slurry concentrator 50 is passed via line 54 to centrifugal drier 56. The mother liquor overflow from slurry concentrator 50 is returned to vacuum crystallizer 42 via line 52, mixing valve 39, and line 40. Within drier 56, the crystals are separated from the mother liquor and are washed with a small volume of aqua ammonia introduced from line 64. Such washing serves to neutralize any slight acidity of the crystalline ammonium sulfate mass. The mother liquor from centrifugal drier 56 is withdrawn through line 66 and a portion is recycled via line 76 to mixing valve 12. The remaining portion is recycled to vacuum crystallizer 42 via lines 66 and 74, mixing valve 39, and line 40. The relative volumes of mother liquor diverted to the two mixing valves depends upon the volume of liquor desired in acid separator 16; as previously stated, it is preferred to supply to mixing valve 12 from 2 to 20 volumes of recycled mother liquor per volume of acid sludge. Final drying is accomplished by blowing hot air from line 68 over the crystals, and the substantially dry product is removed through line 72. The moist air is removed via line 70.

The following examples, described with reference to the aforementioned drawing, serve to illustrate more specifically the process of the invention, but are not to be construed as limiting the same.

EXAMPLE I

An acid sludge comprising 50 volume percent of an agitator sludge derived from the treatment of kerosene and 50 volume percent of a pressure distillate sludge is introduced into the ammonium sulfate recovery system previously described via line 10. A 5 to 1 volume ratio of recycled ammonium sulfate mother liquor to sludge is utilized. The ammonium sulfate concentration in the mother liquor is about 30–35 percent by weight. Sufficient ammonia is added at this point to raise the temperature to about 180° F. The aqueous acid phase withdrawn from separator 16 contains about 9 percent of free sulfuric acid. The acid is then steam stripped of sulfur dioxide in stripper 22, and is contacted in absorber 30 with a waste water stripper effluent comprising steam, hydrogen sulfide, and ammonia supplied through line 32. No air or oxygen is supplied to the absorber. Upon dewatering the aqueous ammonium sulfate solution from absorber 30 as previously described, it is found that over a period of three months the crystals formed are sporadically off-color, e.g., blue, dark brown, purple and green, with a large amount of fines being formed.

When exactly the same conditions and feeds are maintained, except that air is introduced into absorber 30 through line 34 at the rate of 120 s.c.f. per ton of dry ammonium sulfate crystals produced, the product crystals are of uniformly large size and of light color. The following Table 1 presents a comparison of the two modes of operation:

*Table 1*

AMMONIUM SULFATE CRYSTAL PRODUCTION

|  | Without Air | With Air |
| --- | --- | --- |
| Production Period, Days | 90 | 60. |
| Average Production Rate, tons/day | 68 | 70. |
| Crystals greater than 20 mesh, percent | 6 | 34. |
| Crystals smaller than 60 mesh, percent | 18 | 7. |
| Color of crystals | Inconsistently dark blue, purple, brown, etc. | Consistently light tan. |

EXAMPLE II

The process described in Example I is repeated using the identical feeds and operating conditions except that anhydrous ammonia is introduced into absorber 30 via line 33 in place of the waste ammonia stream previously admitted via line 32. Substantially the same results are obtained in this experiment, operated with and without air, for one month production periods as is obtained in Example I and illustrated by Table 1.

Other modifications and advantages which would occur to one skilled in this particular art are to be included in the spirit and scope of this invention as defined by the following claims.

I claim:

1. A process for the manufacture of ammonium sulfate which comprises: (1) admixing spent sulfuric acid sludge, derived from treating hydrocarbon distillates, with recycled ammonium sulfate mother liquor whereby there is obtained an aqueous acid phase and an oil phase; (2) separating said acid phase from said oil phase; (3) contacting said acid phase with ammonia and simultaneously with an oxygen-containing gas, the amount of ammonia employed being sufficient to neutralize a substantial portion of the free acid in said acid phase and less than that required for reaction with all of the free acid in said acid phase; (4) admixing directly from step (3) the resulting acidic ammonium sulfate solution with recycled ammonium sulfate mother liquor while maintaining the resultant mixture at a pH below about 5; (5) partially dewatering directly from step (4) the resulting acidic mixture to obtain crystalline ammonium sulfate and ammonium sulfate mother liquor; (6) separating the ammonium sulfate crystals from the ammonium sulfate mother liquor; (7) recycling a portion of said mother liquor to step (1); and (8) recycling a portion of said mother liquor to step (4).

2. A process according to claim 1 wherein said acid sludge comprises at least one of the sludges selected from the class consisting of sludges derived from the sulfuric acid treatment of hydrocarbons boiling in the solvent-kerosene range, sludges derived from the sulfuric acid treatment of a pressure-distillate naphtha, and sludges obtained in the alkylation of iso-paraffins with olefins in the presence of a sulfuric acid catalyst.

3. A process according to claim 1 wherein, in step (1), the sulfuric acid concentration of said aqueous acid phase is between about 2 percent and about 20 percent by weight, and the amount of mother liquor recycled to step (1) is between about 2 and about 20 volumes per volume of acid sludge.

4. A process according to claim 1 wherein said oxygen-containing gas is air.

5. A process according to claim 1 wherein at least part of said ammonia is obtained by stripping the waste water streams produced in the cracking of nitrogenous hydrocarbon stocks.

6. A process according to claim 1 wherein said aqueous acid phase has sulfur dioxide dissolved therein and wherein, subsequent to step (2) and preceding step (3), said aqueous acid phase is steam-stripped to effect removal of said sulfur dioxide.

7. A process according to claim 1 wherein, in step (1), ammonia is added in an amount sufficient to raise the temperature of said acid phase and said oil phase to a temperature between about 175° F. and about 250° F.

8. A process according to claim 1 wherein, in step (3), the said contacting is effected at a temperature between about 150° F. and about 250° F., and at substantially atmospheric pressure.

9. A process according to claim 1 wherein, in step (5), sufficient ammonia is added whereby said mother liquor has a pH between about 4.0 and about 5.0.

10. A process for the production of crystalline ammonium sulfate which comprises: (1) admixing spent sulfuric acid sludge, derived from treating hydrocarbon distillates, with between about 2 and about 20 volumes of recycled ammonium sulfate mother liquor per volume of said acid sludge and with sufficient ammonia to raise the temperature of the mixture to between about 175° F. and about 250° F., whereby there is obtained an oil phase and an aqueous acid phase having sulfur dioxide dissolved therein and having a sulfuric acid concentration between about 4 percent and about 12 percent by weight; (2) separating said acid phase from said oil phase; (3) steam stripping the acid phase to effect removal of said dissolved sulfur dioxide; (4) contacting the stripped acid phase with ammonia, at least part of which is obtained by stripping the waste water streams produced in the cracking of nitrogenous hydrocarbon stocks, and simultaneously with between about 100 s.c.f. and about 200 s.c.f. of air per ton of crystalline ammonium sulfate produced in subsequent step (6), said contacting being effected at a temperature between about 230° F. and about 250° F., and at substantially atmospheric pressure, the amount of ammonia employed being sufficient to neutralize a substantial portion of the free acid in said acid phase and less than that required for reaction with all of the free acid in said acid phase; (5) admixing directly from step (4) the resulting acidic ammonium sulfate solution with sufficient recycled ammonium sulfate mother liquor to produce an aqueous ammonium sulfate product containing between about 1 percent and about 3 percent by weight of free sulfuric acid; (6) partially dewatering directly from step (5) said aqueous product at a reduced pressure of from about 1 p.s.i.a. to about 6 p.s.i.a. while adding sufficient ammonia to said product to obtain crystalline ammonium sulfate and an ammonium sulfate mother liquor having a pH between about 4.0 and about 5.0; (7) separating the ammonium sulfate crystals from the said mother liquor; (8) recycling a portion of said mother liquor to step (1); and (9) recycling a portion of said mother liquor to step (4).

11. A process according to claim 10 wherein said acid sludge comprises at least one of the sludges selected from the class consisting of sludges derived from the sulfuric acid treatment of hydrocarbons boiling in the solvent-kerosene range, sludges derived from the sulfuric acid treatment of a pressure-distillate naphtha, and sludges obtained in the alkylation of iso-paraffins with olefins in the presence of a sulfuric acid catalyst.

References Cited in the file of this patent

UNITED STATES PATENTS

| | | |
|---|---|---|
| 2,025,401 | Rutherford | Dec. 24, 1935 |
| 2,648,594 | Olson | Aug. 13, 1953 |

FOREIGN PATENTS

| | | |
|---|---|---|
| 109,269 | Great Britain | Aug. 31, 1917 |
| 170,613 | Great Britain | Oct. 31, 1921 |